United States Patent [19]

Cheung

[11] Patent Number: 5,427,017
[45] Date of Patent: Jun. 27, 1995

[54] TOASTER ATTACHMENT

[76] Inventor: Chun-Kong Cheung, Unit 1209, 12/F, Tung Ying Bldg. 100 Nathan Road, Tsimshatsui, Kowloon, Hong Kong

[21] Appl. No.: 186,592

[22] Filed: Jan. 26, 1994

[51] Int. Cl.⁶ .............................................. A47J 37/08
[52] U.S. Cl. ..................................... 99/385; 99/450; 99/427; 99/339
[58] Field of Search ................. 99/385, 339, 340, 357, 99/393, 402, 421 H, 427, 449, 450, 421 HV, 421 HH

[56] References Cited

U.S. PATENT DOCUMENTS

| | | | |
|---|---|---|---|
| 1,741,400 | 12/1929 | Bocchino | 99/421 H |
| 2,521,855 | 9/1950 | Kodadek et al. | 99/339 |
| 2,693,751 | 11/1954 | Allen | 99/339 |
| 2,791,959 | 5/1957 | Pirz | 99/421 H |
| 3,068,852 | 12/1962 | Purtzer | 99/421 H |
| 3,866,525 | 2/1975 | Oxel | 99/385 |
| 4,276,821 | 7/1981 | Brown | 99/339 |
| 4,442,762 | 4/1984 | Beller | 99/340 |
| 5,224,676 | 7/1993 | Johnston | 99/421 HV |

FOREIGN PATENT DOCUMENTS

| | | | |
|---|---|---|---|
| 3045751 | 7/1982 | Netherlands | 99/385 |
| 1245067 | 9/1971 | United Kingdom | 99/385 |

*Primary Examiner*—David A. Scherbel
*Assistant Examiner*—Patrick F. Brinson
*Attorney, Agent, or Firm*—Burns, Doane, Swecker & Mathis

[57] ABSTRACT

A toaster attachment comprises a wire basket 20 that may be fitted to a conventional toaster. The attachment includes securing means 9 and means 15 for rotating the basket member 20 above the bread receiving opening of a conventional toaster. In this was a conventional toaster may be used to toast or warm through food products other than flat slices of bread, for example bread rolls, muffins, marshmallows, nuts etc, using the heat generated by the heating elements within the toaster. The attachment may be a completely seperate element from the toaster, or certain elements may be incorporated into the toaster itself.

7 Claims, 4 Drawing Sheets

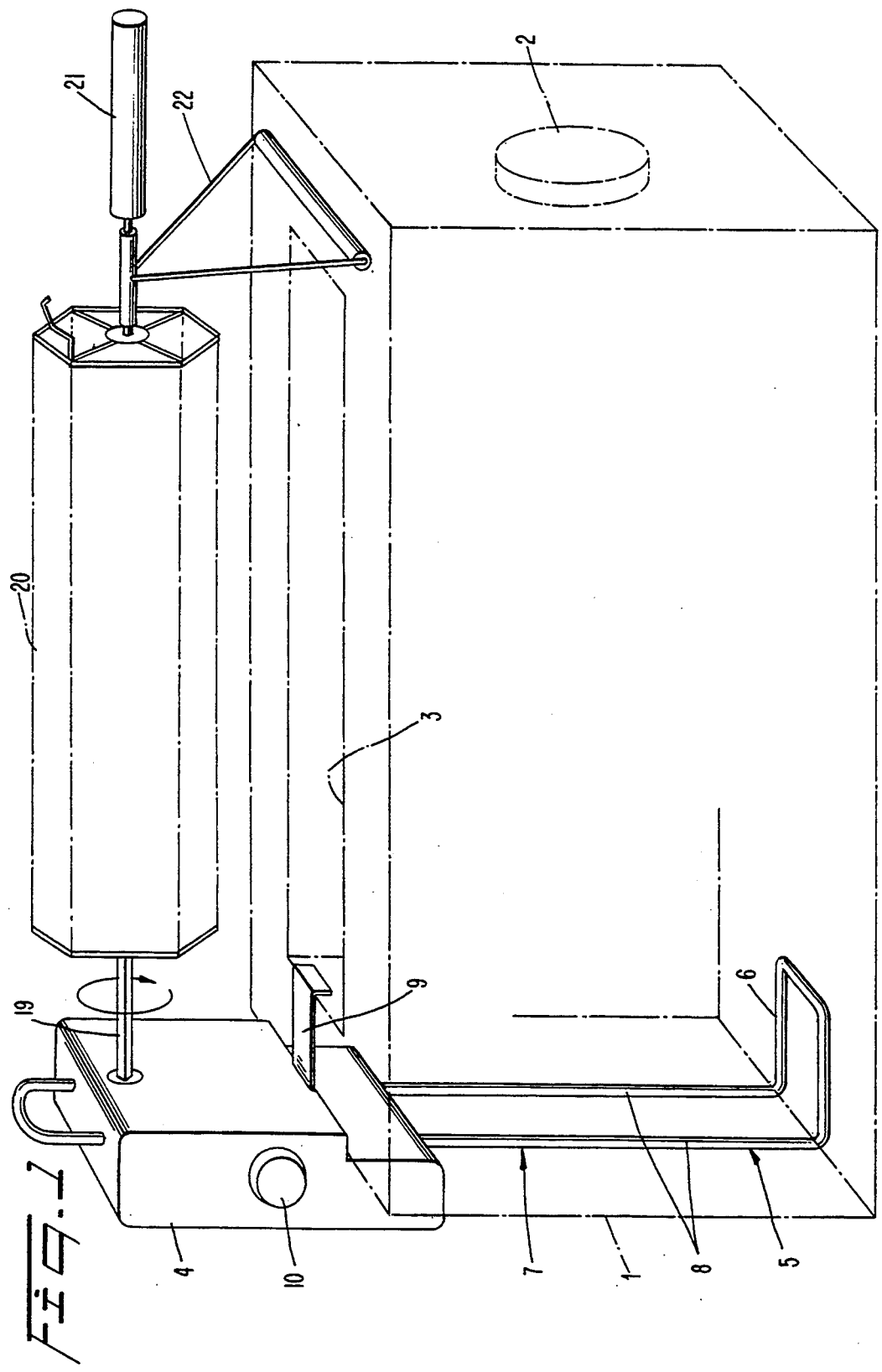

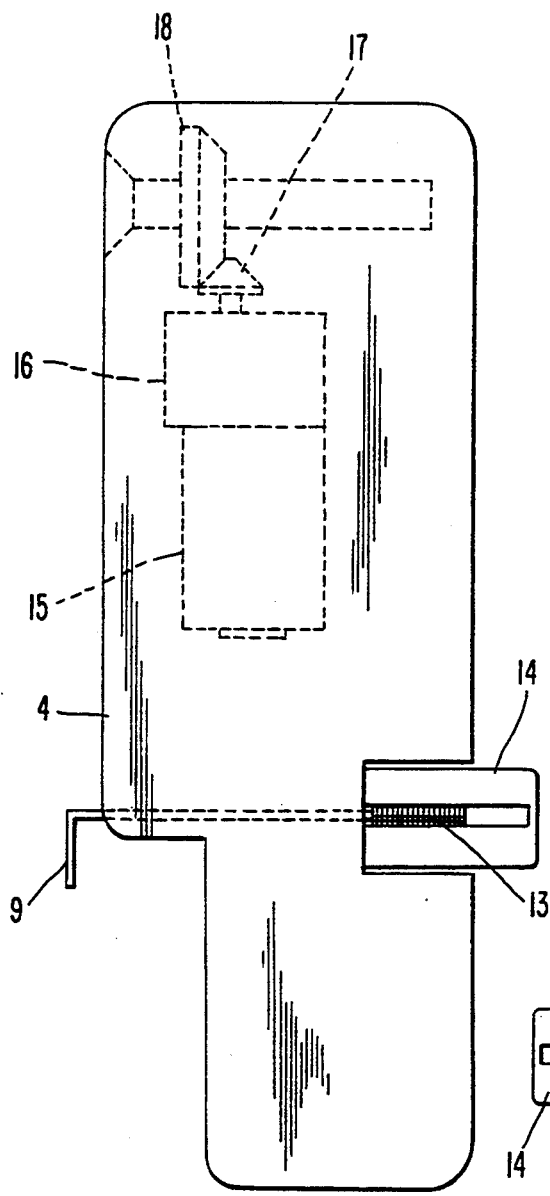
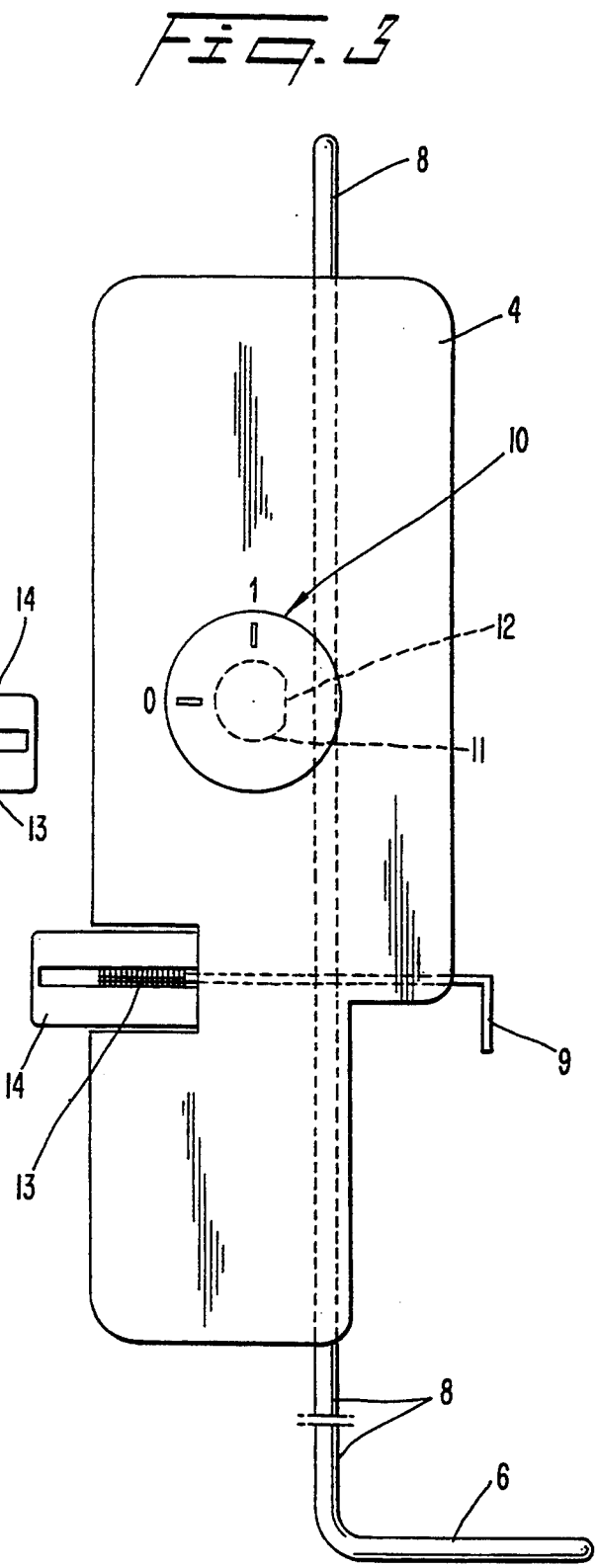

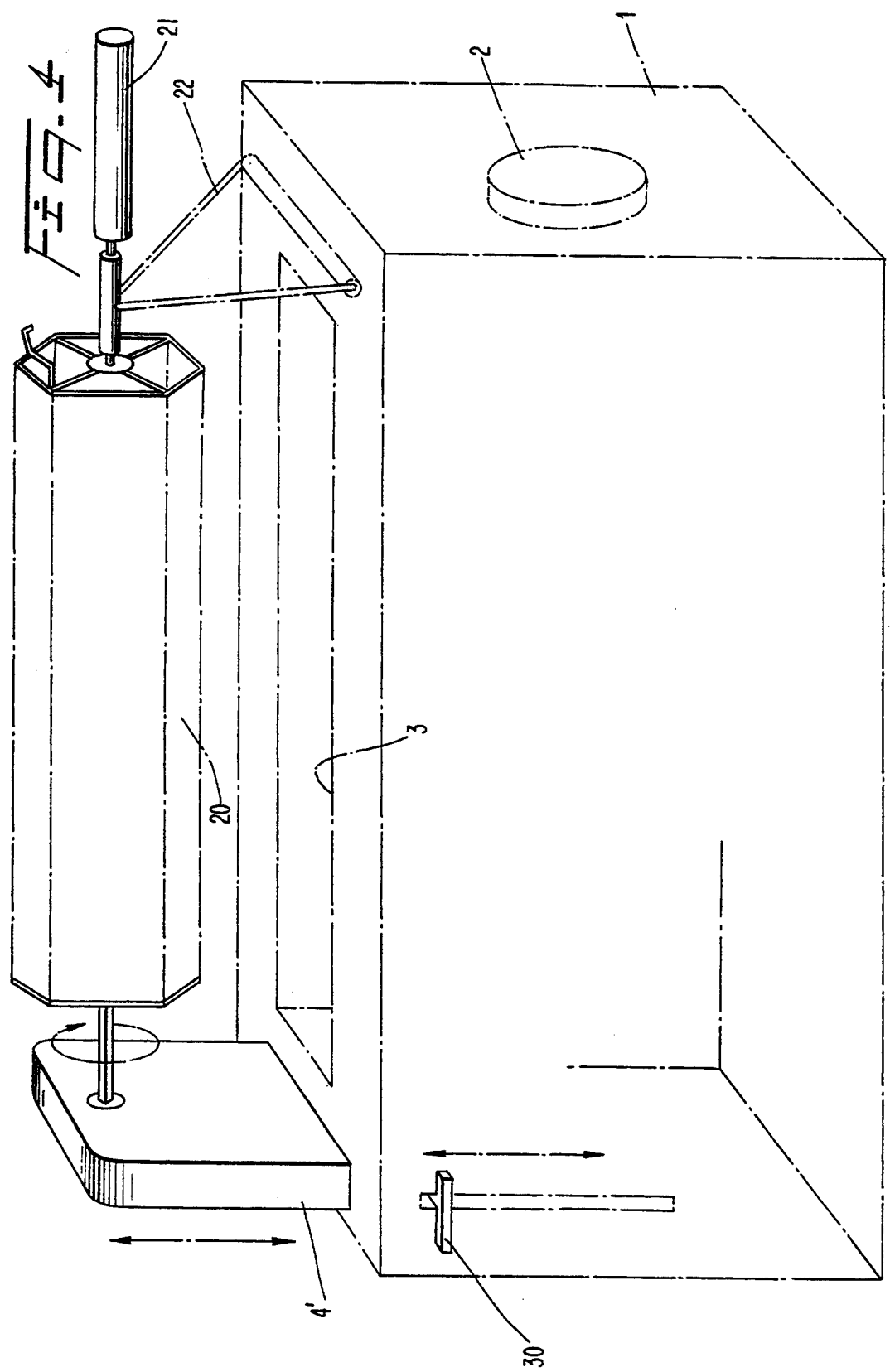

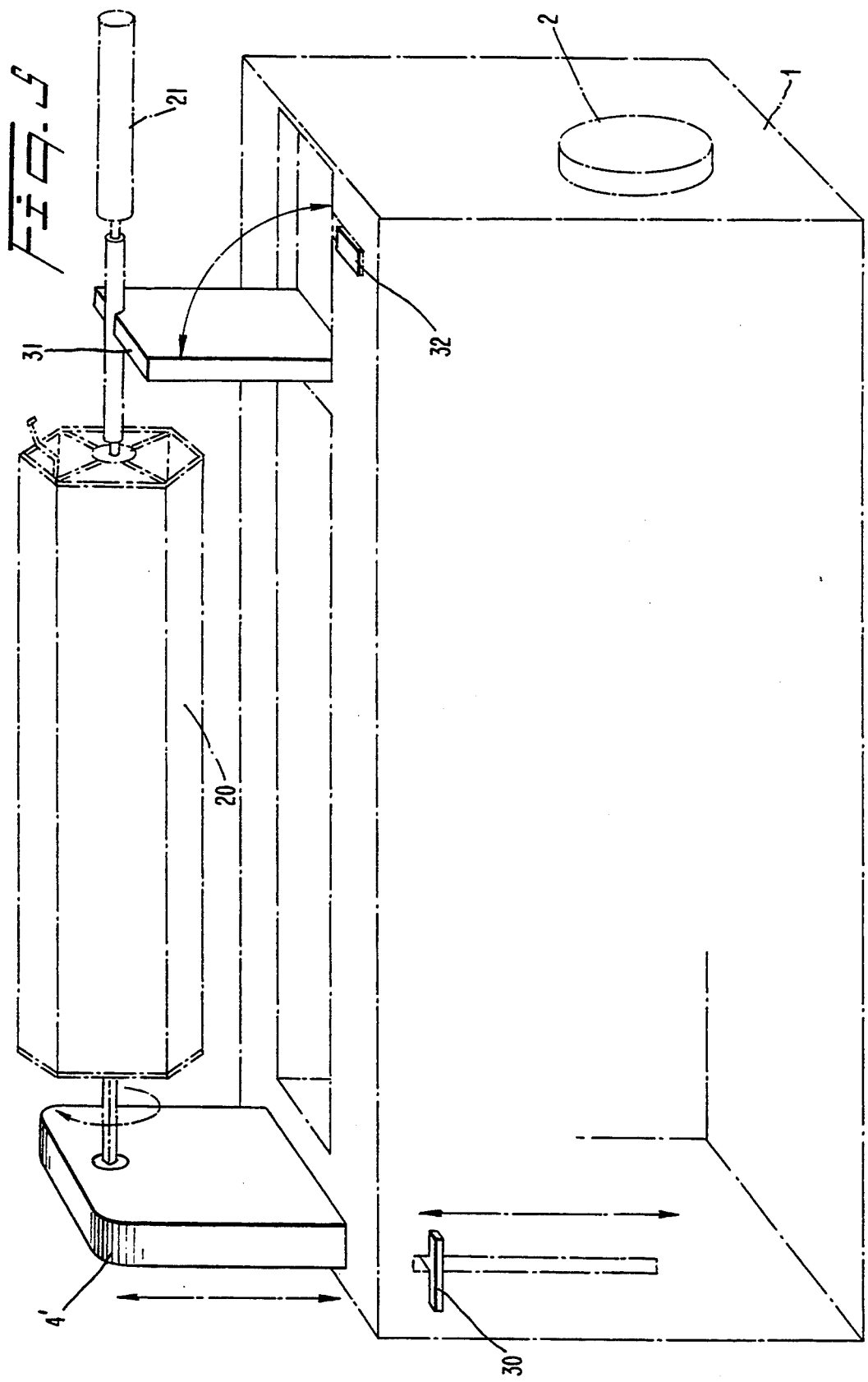

TOASTER ATTACHMENT

FIELD OF THE INVENTION

This invention relates to electric toasters, and in particular to an attachment for an electric toaster to increase the range of uses of the toaster.

BACKGROUND OF THE INVENTION

The conventional electric toaster generally comprises a box-like structure, the upper surface of which is provided with two openings in the form of slots for receiving slices of bread to be toasted. Within the slots are provided electric heating elements for toasting slices of bread received therein. Such toasters can of course only toast slices of bread that can be safely received within the bread receiving slots. If a user attempts to toast a slice of bread that is too thick, there is a danger that it will come into contact with the heating elements or at least be too close and will burn rather than toast. Such conventional toasters cannot of course be used to toast bread products that are not generally planar and which therefore can be received within the toaster.

The problem of toasting thicker slices of bread has at least partially been solved by toasters of the type having a single bread receiving slot of a variable width which can therefore accommodate a range of thicknesses. However such toasters are still incapable of toasting: non-planar bread products such as rolls, and even semi-planar products such as English muffins and crumpets can present difficulties.

SUMMARY OF THE INVENTION

It is an object of the present invention therefore to provide an attachment for a conventional toaster that will allow the toaster to be used to toast non-planar bread products. According to the present invention therefore there is provided an attachment for a toaster, comprising; means for receiving a food product, means for securing the attachment to a toaster such that when the attachment is secured to the toaster said food product receiving means is located above a bread receiving opening of the toaster.

By means of this arrangement in use the attachment may be fitted to a conventional toaster and a bread product such as a roll may be received by the food product receiving means so as to locate the roll above the bread receiving opening of the toaster. Upon operation of the toaster the bread product will then be toasted by the heat emanating from the bread receiving opening.

Preferably means may be provided for selectively rotating the food product receiving means so that a bread product received therein is toasted evenly on all sides. Of course the attachment need not necessarily be used to toast the bread product, but simply be used to warm through the bread product. Indeed, although the invention has particular application to the toasting and-/or warming of bread products, it is not limited thereto and may for example be used for toasting nuts, marshmallows or other food products.

Preferably the attachment is adapted to fit a wide range of different toaster sizes, and preferably is provided with adjustable engagement means whereby the attachment may be securely attached to different sizes of toasters. Such adjustable engaging means may include height adjusting means and lateral adjusting means. In a preferred embodiment the securing means may comprise hook means for engaging one end of the bread receiving opening of the toaster, and said height adjusting means may comprise means for adjusting the vertical position of the hook means, and the lateral adjusting means may comprise means for adjusting the lateral position of the hook means.

The food product receiving means may preferably comprise a basket into which the food product may be placed. The basket is preferably enclosed to prevent a bread or other food product from falling out upon rotation of the basket, and preferably one side of the basket is openable to permit a bread or other food product to be inserted and removed from the basket. The basket may be elongate so that it extends the length of the bread receiving opening and is preferably arranged to rotate about its longitudinal axis, with the means for rotating the basket being provided at one end of the basket, and the other end of the basket being provided with a support means. Preferably the means for causing rotation comprises an electric motor which may be either battery or mains powered.

As described so far the present invention is in the form of an attachment for a conventional toaster. It will of course be appreciated that the invention could also be provided as an integral part of a toaster.

BRIEF DESCRIPTION OF THE DRAWINGS

Several embodiments of the invention will now be described by way of example and with reference to the accompanying drawings, in which:

FIG. 1 is a perspective view of a first embodiment of the invention in use,

FIG. 2 is a view from one side of a main body part,

FIG. 3 is a view from the other side of the main body part together with a rack frame member, FIG. 4 is a view similar to FIG. 1 but showing an integrated embodiment of the invention, and FIG. 5 is a view similar to FIG. 1 but showing a further integrated embodiment of the invention.

DETAILED DESCRIPTION OF PREFERRED EMBODIMENTS

Referring firstly to FIG. 1 there is shown a first embodiment of the invention in the form of an attachment for use with a conventional toaster. The toaster, which is shown in the figure in broken lines, comprises a toaster body 1 having a control knob 2. The toaster body 1 is generally cuboid in shape and in the upper surface of the body 1 there is provided a slot-like opening 3 for receiving a piece of bread to be toasted in normal operation of the toaster. Within the opening 3 are electric heating elements for performing the toasting operation.

The attachment comprises a main body 4 which is adjustably mounted on a stand 5. The stand 5 comprises a foot portion 6 which underlies the toaster in use, and a vertical portion 7 in the form of a pair of vertical rod members 8 interconnected at an upper portion. The vertical rod members 8 pass through the main body 4 which is adjustably mounted thereon in a manner to be described further below.

The main body 4 of the attachment includes a hook member 9 which extends therefrom parallel to the foot portion 6 of the stand 5 and which is adapted to engage the end of the opening 3 of the toaster. The combined effect of the foot portion 6 beneath the toaster body and the hook member 9 engaging the end of the opening is to secure the attachment to the toaster body.

The main body 4 of the attachment can slide up and down upon the rod members 8 and includes means for fixing the main body 4 at a desired height. In particular the main body 4 includes a locking member 10 provided with a cam member 11. The cam member 11 has a cutaway portion 12 whereby when the locking member is in a first unlocked position the cam member does not engage the vertical rod members and the main body 4 is free to slide thereon, but upon rotation of the locking member into a second locked position the cam member 11 is rotated so that it engages the rod members 8 and prevents the main body from sliding thereon. Thus the vertical position of the main body 4, and hence the vertical position of the hook member 9, can be adjusted depending on the height of the toaster to which the attachment is to be fitted.

The end of the hook member 9 that does not engage the toaster is provided with a threaded shaft portion 13 which is received within an adjusting button 14. Upon rotation of the button 14 the hook member is caused to move laterally.

In use the attachment is fitted to a toaster by inserting the foot portion beneath the toaster, and then lowering the main body 4 until the hook member 6 engages the top of the toaster. The main body 4 is then locked in its vertical position, and by operation of button 14 the lateral position of the hook member is adjusted until it securely engages the end of the opening of the toaster.

Provided within the main body 4 of the attachment is an electric motor 15, which may be either battery or mains powered, and an output gear train 16 which drives via a bevel gear 17 an output drive gear 18. The output drive gear 18 has a central aperture for locating, for example by splines, a shaft 19 of a bread product receiving member 20. Referring to FIG. 1 in particular it will be seen that the bread product receiving member 20 is generally elongate and has a shaft 19 extending from one end along the axis of the receiving member 20 and which is adapted to be fitted in the main body 4 of the attachment so as to be rotatably driven by the motor 15 and output drive gear 18.

The bread product receiving member 20 comprises a wire basket substantially hexagonal in cross-section. As explained above, a shaft 19 extends from one end along the axis of the basket for rotatably driving the basket, while from the other end, ie the end remote from the main body 4 of the attachment, there is provided a handle 21. The handle end of the basket is also provided with a rest 22 whereby the end of the basket remote from the main body 4 of the attachment may be supported with the rest 22 resting on the top surface of the toaster body. Although not shown in the drawings one of the six sides of the basket is hinged at one end and can be opened to permit, for example, a bread roll to be placed in the basket and removed therefrom after use. Some form of catch means is provided whereby the basket may be opened and closed.

In use of the attachment described above, firstly the main body 4 and stand 5 are fixed securely to the toaster in the manner described above. The shaft 19 of the basket 20 is located in the output drive of the main body, and the other end of the basket is supported by the rest 22. A bread product such as a roll is then placed in the basket, the motor 15 is operated to rotate the basket, and the toaster is switched on to energise the heating elements and provide a source of heat. The toaster remains switched on until the roll is toasted or warmed through to the extent desired, and then the toaster is switched off, the motor 15 is switched off to stop rotation of the basket 20 and the roll is removed from the basket.

The embodiment described above with reference to FIGS. 1–3 is an attachment that is adapted to be fitted to a conventional toaster. It will be apparent, however, that at least certain elements of the attachment could be formed as an integral part of a toaster. An example of such a possibility is shown in FIG. 4 In this embodiment the main body 4' is provided as an integral part of the toaster and may be moved into an operative position by a lift mechanism 30 when the attachment is to be used. When it is not required, the main body 4' may be lowered into the body of the toaster out of the way. When the main body is formed as a part of the toaster it will of course be appreciated that the motor can be powered from the mains supply to the toaster itself.

In the embodiment of FIG. 4 the remainder of the attachment, ie the wire basket 20 and the rest 22, is the same as in the first described embodiment. Another possibility, however, is that the rest may also be integrated as part of the toaster. This is illustrated in FIG. 5 in which the rest takes the form of a flip up stand 31. When the attachment is not in use the flip up stand lies horizontally in the upper surface of the toaster, and when the attachment is to be used the flip up stand 31 is released by operation of a release button 32 and pivoted into a vertical position to support the end of the basket 20. The remainder of this embodiment corresponds to the embodiment shown in FIG. 4.

I claim:

1. An attachment for a toaster, comprising;
   a main body portion, including means for securing said main body portion to a toaster having a bread receiving opening and rotation drive means comprising an electric motor,
   a generally elongate rotatable wire basket member for receiving a food product, including at one end of said generally elongate rotatable wire basket member means for engaging said rotation drive means, said basket member having a plurality of sides and one of said sides being openable and closable, and
   means for supporting the end of said basket member remote from said rotation drive means, the arrangement being such that in use when the attachment is secured to a toaster the principal axis of the basket member is located substantially parallel and above the bread receiving opening of the toaster.

2. An attachment as claimed in claim 1 further comprising adjustable engagement means whereby the attachment may be securely attached to different sizes of toaster.

3. An attachment as claimed in claim 1 wherein the attachment includes hook means for engaging one end of the bread receiving opening.

4. An attachment as claimed in claim 3 further comprising means for adjusting the vertical position of said hook means.

5. An attachment as claimed in claim 3 further comprising means for adjusting the lateral position of said hook means.

6. An attachment as claimed in claim 2 wherein said adjustable engagement means comprises a hook means, means for adjusting the vertical position of said hook means, and means for adjusting the lateral position of said hook means.

7. In combination a toaster and an attachment for a toaster, the toaster including means for securing the attachment to the toaster and rotation drive means, comprising an electric motor, and said attachment including a generally elongate rotatable wire basket member for receiving a food product, including at one end of said generally elongate rotatable wire basket member means for engaging said rotation drive means, said basket member having a plurality of sides and one of said sides being openable and closable, and means for supporting the end of the basket member remote from the rotation drive means, the arrangement being such that in use when the attachment is secured to the toaster the principal axis of the basket member is located substantially parallel to and above a food receiving opening of the toaster.

* * * * *